(12) United States Patent
Wang

(10) Patent No.: US 7,419,260 B1
(45) Date of Patent: Sep. 2, 2008

(54) EYEGLASS ASSEMBLY

(75) Inventor: Ching-Hsiang Wang, Tainan (TW)

(73) Assignee: Day Sun Industrial Corp., Tainan (TW)

( * ) Notice: Subject to any disclaimer, the term of this patent is extended or adjusted under 35 U.S.C. 154(b) by 0 days.

(21) Appl. No.: 11/751,229

(22) Filed: May 21, 2007

(51) Int. Cl.
*G02C 3/00* (2006.01)

(52) U.S. Cl. ..................... 351/156; 351/157

(58) Field of Classification Search ............ 351/156, 351/157, 158, 41, 111, 123, 116
See application file for complete search history.

(56) References Cited

U.S. PATENT DOCUMENTS

| | | | | |
|---|---|---|---|---|
| 2,648,255 A | * | 8/1953 | Pendleton | 351/157 |
| 2,798,409 A | * | 7/1957 | Speers | 351/157 |
| 4,930,885 A | * | 6/1990 | Laschober | 351/156 |
| 5,367,347 A | * | 11/1994 | Wilson et al. | 351/156 |
| 5,475,449 A | * | 12/1995 | Pyle | 351/123 |
| 5,594,511 A | * | 1/1997 | Lin | 351/116 |

\* cited by examiner

*Primary Examiner*—Hung X Dang
(74) *Attorney, Agent, or Firm*—Alan Kamrath; Kamrath & Associates PA

(57) ABSTRACT

An eyeglass assembly having a secondary eyeglass frame combined with a main eyeglass frame by a protection strip is provided. A pair of eyeglass temples connected to the main eyeglass frame is adjustable to an angle as desired. When the eyeglasses are used for sport purpose, a strap may be fastened to the eyeglass temples by inserting a stopping portion of an engaging member of the strap into a preset hole on the eyeglass temple and allowing the stopping portion engaged with a crossed inner groove adjacent the hole by rotating at a direction such that the strap and the eyeglass temples can be quickly fastened to achieve stable positioning or quickly disassembled when not in use.

1 Claim, 8 Drawing Sheets

EYEGLASS ASSEMBLY

FIELD OF THE INVENTION

The present invention relates to an eyeglass assembly; particularly, the present invention relates to a pair of eyeglasses having a secondary eyeglass frame combined with secondary functional lenses and a protection strip at one side of the eyeglasses so that stable positioning can be achieved through engagement and pass through of a main eyeglass frame, the secondary eyeglass frame, and the protection strip. A pair of eyeglass temples pivotally connected at both sides of the eyeglasses can be adjusted with different angles as desired. When the eyeglasses are used for sport purpose, the other end of a stopping portion at each engaging ends of a strap passing through a hole at a predetermined section on each of the eyeglass temples can be rotated in a direction so as to form a tightly coupled status with a crossed inner groove. As a result, the strap and the eyeglass temples can be quickly fastened to achieve stable positioning or quickly disassembled when not in use.

BACKGROUND OF THE INVENTION

Conventional eyeglasses are mostly designed with multiple purposes so as to accommodate a variety of functions, such as vision-adjusted optical eyeglasses and sport eyeglasses. With respect to conventional sport eyeglasses, a protection strip is commonly added at an inner side of the eyeglass frame to protect the forehead of a user. A secondary eyeglass frame combined with secondary function lenses can be added at one side of the eyeglasses to adjust vision of a user wearing such type of sport eyeglasses. A variety of eyeglasses combining the protection strip and the secondary eyeglass frame are provided for user selection. The sport type eyeglasses are designed such that an angle of eyeglass temples can be adjusted to fit different users so as to provide comfort when wearing the eyeglasses. For a sport eyeglass assembly, a strap is also used to bundle the eyeglass temples pivotally connected at the two sides of the eyeglass frame. A variety of strap combination also exists for user selection.

SUMMARY OF THE INVENTION

The present invention is to provide an additional design upon a conventional eyeglass assembly of a protection strip and a secondary eyeglass frame so that a user can quickly assemble and disassemble elements as needed, thereby enhancing the functions of the eyeglass assembly combined with the protection strip and the secondary eyeglass frame. Meanwhile, a strap assembly bundling eyeglass temples of the eyeglasses is designed for sport purpose so as to be easily engaged when in use and disassembled when not in use.

One object of the present invention is to provide an eyeglass assembly having a main eyeglass frame, a protection strip connected with the main eyeglass frame, and a secondary eyeglass frame assembled with second functional lenses. A groove is formed at a middle section of the main eyeglass frame so as to correspondingly accommodate an engaging portion extending forward from the protection strip, the engaging portion having a stopping hole. A recess passes through a middle section of the secondary eyeglass frame and is formed with a hole at a rear side so as to accommodate a downward extending segment of the protection strip with a protrusion on the segment being inserted into the hole. Spaced positioning portions respectively extend from both sides of the protrusion strip and are respectively inserted into corresponding containing spaces provided at both sides of the main eyeglass frame so as to assemble the main eyeglass frame and the protection strip as well as the secondary eyeglass frame into a stable position.

Another object of the present invention is to provide a pair of connecting elements provided between the eyeglass frame and the eyeglass temples. Each of the connecting elements is formed with a pair of spaced protrusions on one end. A through hole is formed on the other end of the connecting element and extends from a space between the pair of protrusions. A boundary element with a plurality of teeth is formed along an inner side thereof. The protrusions has designed holes and containing spaces respectively provided on outer sides. The boundary element allows a front section, having a designed hole and extending from one side of each eyeglass temple, to pass through the space between the protrusions of the connecting element. The designed holes of the protrusions and the front section are then coincided with a designed stopping portion at one end of an engaging element subsequently passing through the designed holes and being rotated at a direction so as to be restricted at an outer side of the containing space of the connecting element and with a protrusion at the other end of the engaging element being restricted in the containing space at the corresponding side of the connecting element. A toothed shift element protruded forward from the front section of the eyeglass temple passes through the through hole of the connecting element so as to make a positional shift with the boundary element. Whereby the eyeglass temples pivotally connected at both sides of the eyeglass frame can be moved as needed by stable positional shift of the shift element along with the boundary element of the connecting element.

Yet another object of the present invention is to provide a lateral hole on an outer side at a predetermined section on each of the eyeglass temples pivotally connected to both sides of the eyeglass frame so as to communicate a recess at an inner side thereof. An crossed inner groove is formed between the lateral hole and the recess so as to allow a stopping portion of an engaging member at each end of a strap to rotate at a direction after being inserted into the lateral hole of the eyeglass temple so that the stopping element is tightly coupled with a lower portion of the inner groove. Whereby the strap and the eyeglass temples are quickly fastened and firmly positioned and can be easily disassembled.

DETAILED DESCRIPTION OF THE EMBODIMENTS

Figure 1:
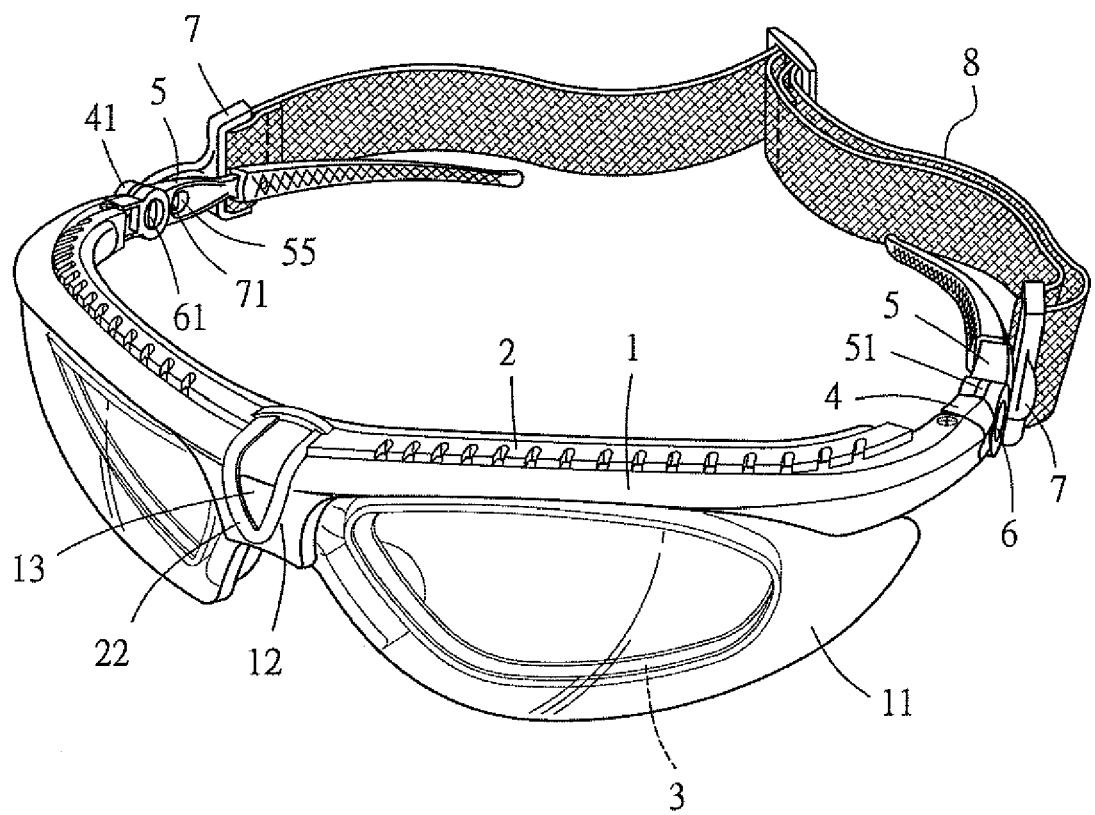
FIG. 1 is a perspective view of an eyeglass assembly in accordance with the present invention.

Referring to FIG. 1, an eyeglass assembly in accordance with the present invention includes an eyeglass frame 1 combined with a pair of lenses 11, a protection strip 2 provided at one end of the eyeglass frame 1, and a secondary eyeglass frame 3 assembled with a pair of secondary functional lenses, as well as a pair of connecting elements 4 provided between protrusions at both sides of the eyeglass frame 1 and eyeglass temples 5, and a strap 8 bundling the two eyeglass temples 5 of the eyeglasses.

Figure 2:
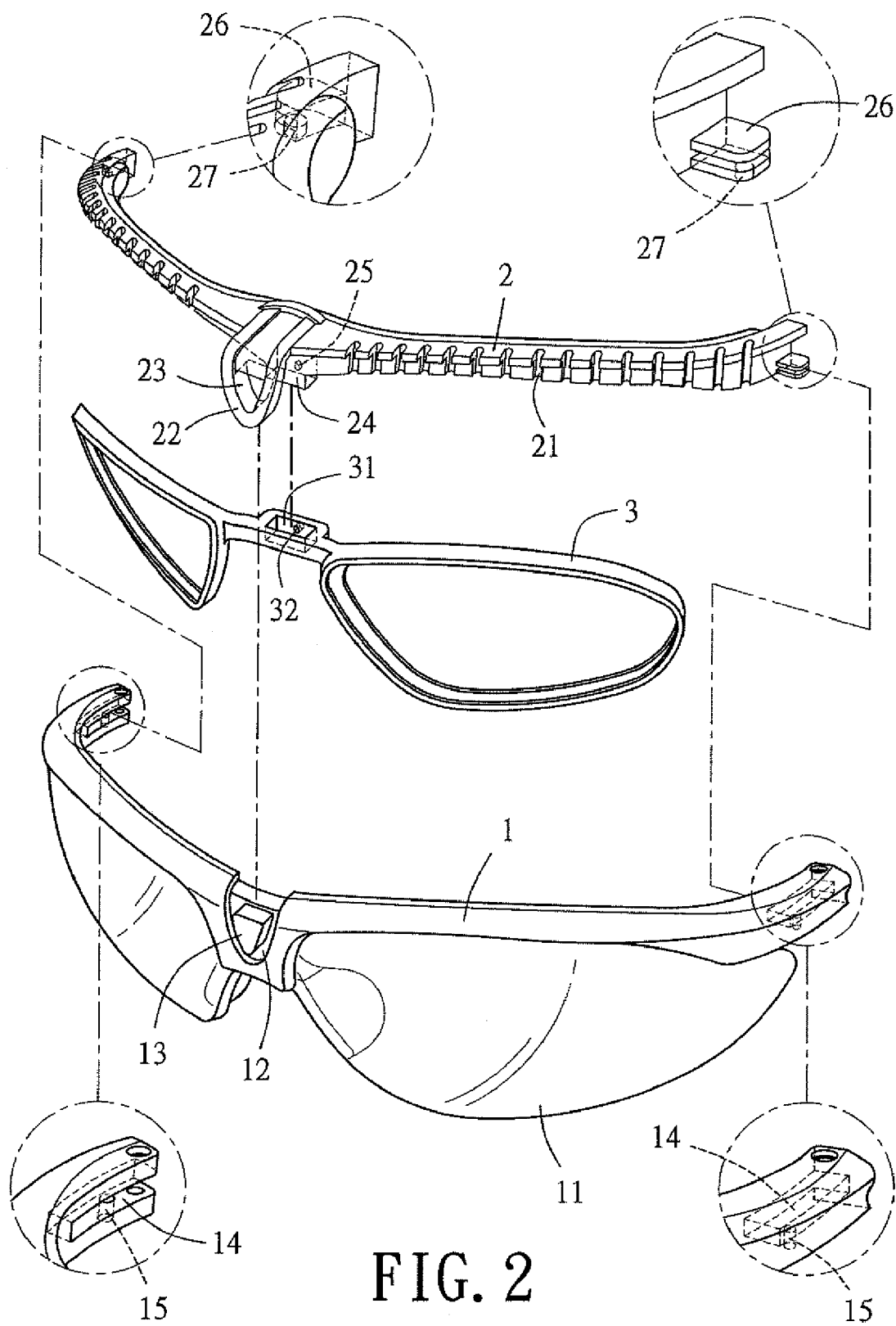
FIG. 2 is an exploded perspective view of the assembly of a main eyeglass frame and a protection strip as well as a secondary eyeglass frame in accordance with the present invention.

FIG. 2 illustrates the assembly of the eyeglass frame 1 combined with the lenses 11 and the protection strip 2 provided at one end thereof as well as the secondary eyeglass frame 3 assembled with the secondary functional lenses.

A groove 12 is formed in a middle section of the eyeglass frame 1. A restricting element 13 is maintained in the groove 12. A containing space 14 is concavely provided at an inner end of each side of the eyeglass frame 1 and provided with a hole 15 passes there through.

The protection strip 2 is a soft strip formed with a plurality of vertical air-passing grooves 21 toward a front perimeter. An engaging portion 22 having a stopping hole 23 extends forward from the middle portion of the protection strip 2. A segment 24 provided with a protrusion 25 at a rear side extends downward from the protection strip 2 adjacent to the engaging portion 22. Additionally, two positioning portions 26 having a space respectively extend from both sides of the protection strip 2. Each of the positioning portions 26 has a protrusion 27 formed on the bottom.

The secondary eyeglass frame 3 has a recess 31 passing through a middle section thereof and a hole 32 formed backward thereof.

Figure 3:
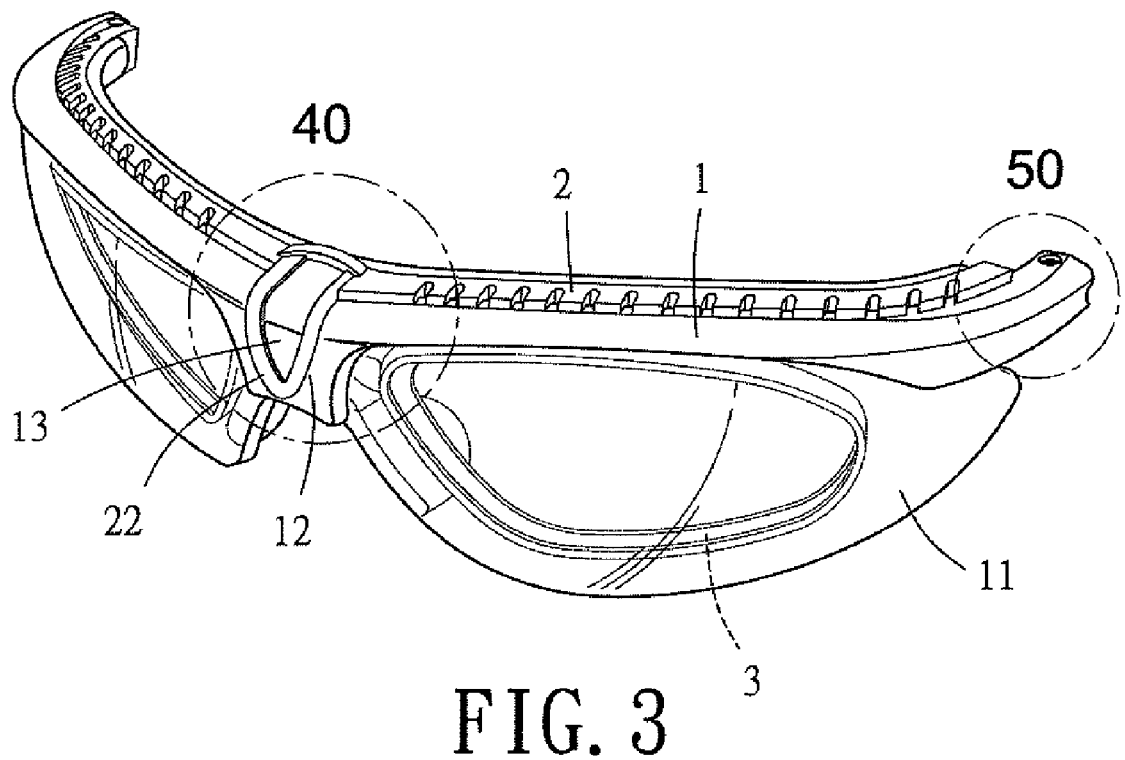
FIG. 3 is a schematic view of the assembly of the eyeglass frame and the protection strip as well as the secondary eyeglass frame in accordance with the present invention.
Figure 4:
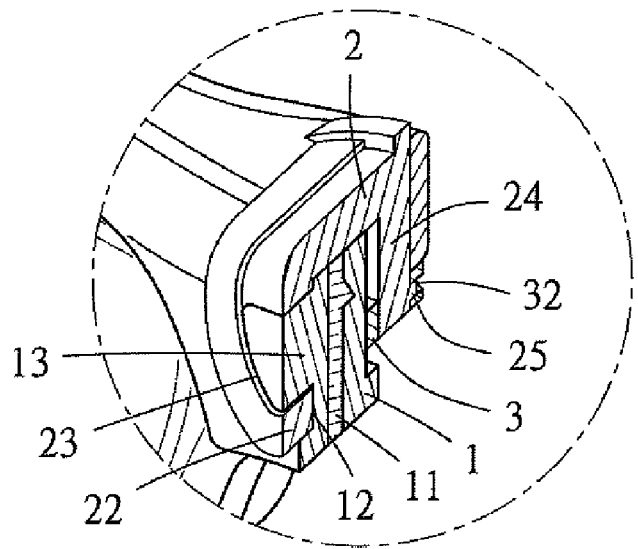
FIG. 4 is a cross-sectional view of circle 40 in FIG. 3.
Figure 5:
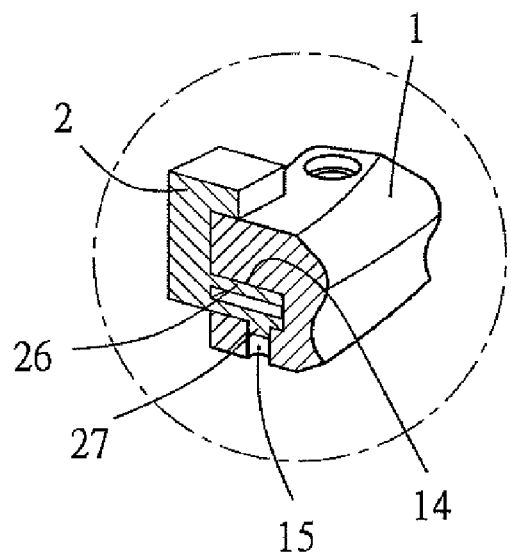
FIG. 5 is a cross-sectional view of circle 50 in FIG. 3.

FIG. 3 illustrates the assembly of the eyeglass frame 1 and the protection strip 2 as well as the secondary eyeglass frame 3. The engaging portion 22 extending forward from the protection strip 2 is correspondingly contained in the groove 12 of the eyeglass frame 1 such that the stopping hole 23 between the engaging portion 22 is forcefully engaged to the restricting element 13 in the middle position, as shown in FIG. 4. Then, the downward extending segment 24 extending downward from the protection strip 2 is correspondingly engaged to the recess 31 of the secondary eyeglass frame 3 and makes the protrusion 25 be inserted into the hole 32, as shown in FIG. 4. Finally, the positioning portions 26 extending from both sides of the protection strip 2 are correspondingly engaged to the containing spaces 14 of the eyeglass frame 1, as shown in FIG. 5, and the protrusions 27 on the bottoms of the positioning portions 26 are forced through the containing spaces 14 and stop at the holes 15. As a result, the eyeglass frame 1 and the protection strip 2 as well as the secondary eyeglass frame 3 are stably assembled.

Figure 6:
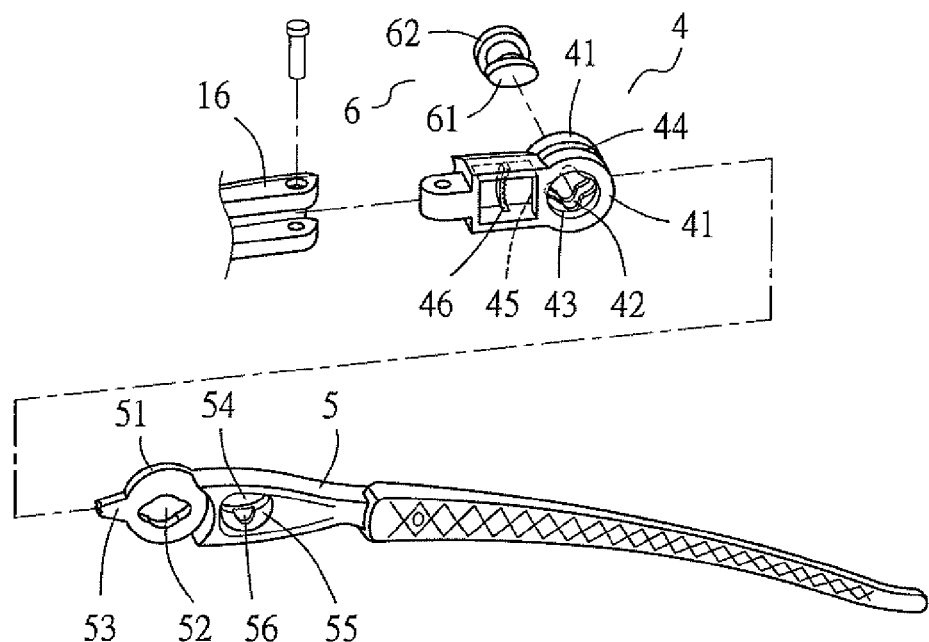
FIG. 6 is an exploded perspective view of an eyeglass temple and a connecting element in accordance with the present invention.
Figure 7:
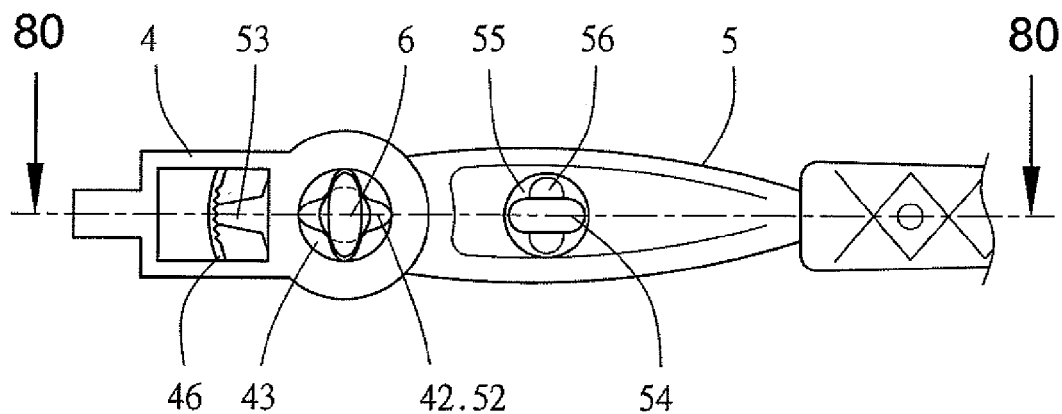
FIG. 7 is a schematic view of the assembly of the eyeglass temple and the connecting element in accordance with the present invention.
Figure 8:
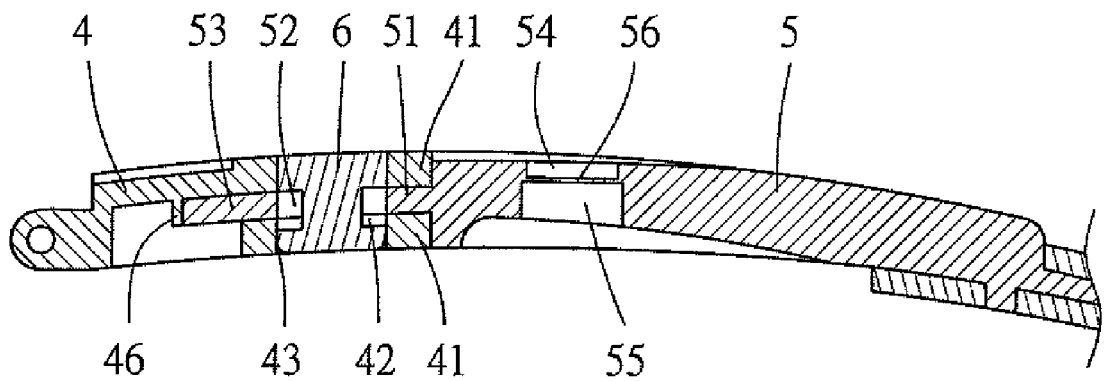
FIG. 8 is a cross-sectional view taken alone line 80-80 of FIG. 7.
Figure 9:
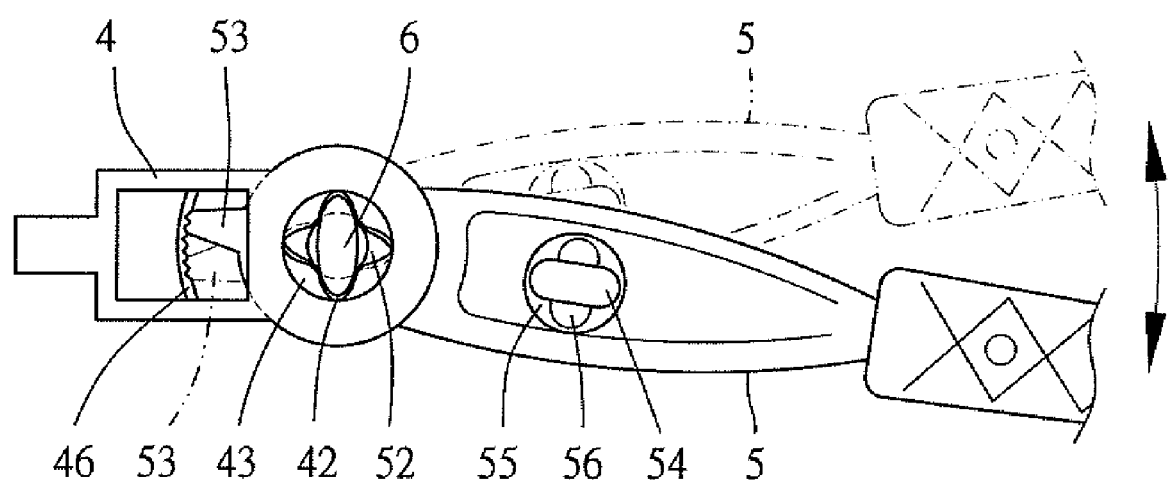
FIG. 9 illustrates positional shift of the eyeglass temple and the connecting element in accordance with the present invention.

Refer to FIG. 9. In accordance with the present invention, in order to adjust an angle pivotally connecting each of the eyeglass temples 5 at each side of the eyeglass frame 1, each of the connecting elements 4 is used to combine a protrusion 16 of each eyeglass temple 5 pivotally connected at two sides of the eyeglass frame 1 and the eyeglass temple 5, as shown in FIG. 6. One end of the connecting element 4 is formed with a pair of spaced protrusions 41 having designed holes 42. Outer sides of the through holes 42 are provided with containing spaces 43. A through hole 45 extends from a space 44 formed between the pair of protrusions 41. The trough hole 45 is formed with a boundary element 46 having a plurality of teeth along an inner side thereof so as to allow a front section 51, with a designed hole 52, extending at one end of the eyeglass temple 5 to be accommodated in the space 44 between the protrusions 41 of the connecting element 4, as shown in FIG. 8. Such that the designed holes 52, 42 of the protrusions 41 and the front section 51 are coincided, as shown in FIG. 7. Then, a designed stopping portion 61 at one end of an engaging element 6 subsequently passes through the designed holes 42, 52 and is rotated at a direction so as to be restricted at an outer side of the containing space 43 of the connecting element 4, as shown in FIGS. 6 and 7. A protrusion 62 at the other end of the engaging element 6 is restricted in the corresponding containing space 43 of the connecting element 4, as shown in FIG. 8. A toothed shift portion 53 extending forward from the front section 51 of the eyeglass temple 5 passes through the through hole 45 of the connecting element 4 so as to make a positional shift with the boundary element 46, as shown in FIG. 7. When each of the eyeglass temple 5 connected at both ends of the eyeglass frame 1 is moved as needed, one end of the shift element 53 can make a positional shift with the boundary element 46 of the connecting element 4, as shown in FIG. 9.

Figure 10:
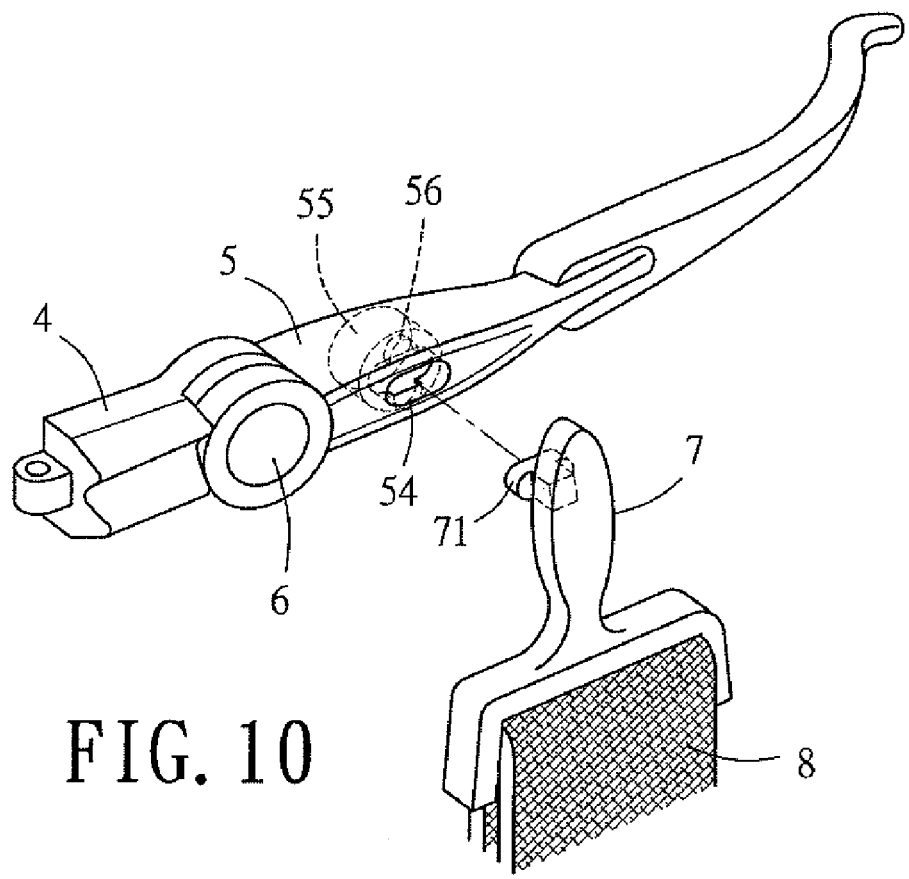
FIG. 10 is an exploded perspective view of a strap with engaging members and the eyeglass temple in accordance with the present invention.

Referring to FIG. 10, the eyeglass assembly of the present invention can be used for sport purpose, wherein a strap 8 having engaging tools 7 is fastened with eyeglass temples 5 pivotally connected at both sides of the eyeglasses.

Each of the eyeglass temples 5 is provided with a lateral hole 54 on an outer side at a predetermined section so as to communicate with a recess 55 at an inner side thereof. A crossed inner groove 56 is formed between the lateral hole 54 and the recess 55.

A pair of engaging members 7 are used to bundle two ends of the strap 8 respectively. One side of each of the engaging members 7 is formed with a stopping portion 71 corresponding to the shape of the lateral hole 54 of the eyeglass temple 5.

Figure 11:
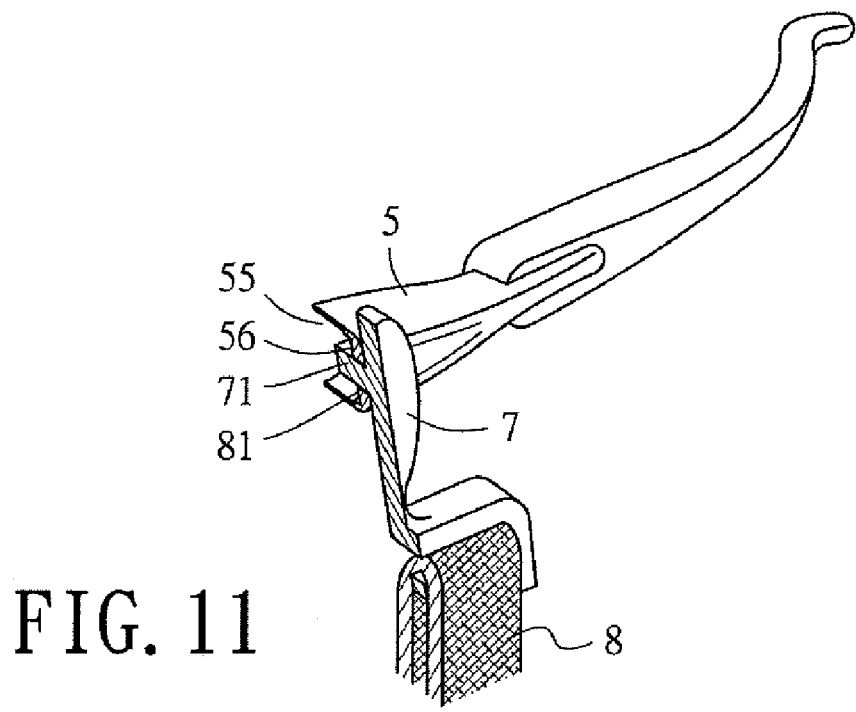
FIG. 11 is a cross-sectional view detailing the assembly of the strap with the engaging member and the eyeglass temple in accordance with the present invention.
Figure 12:
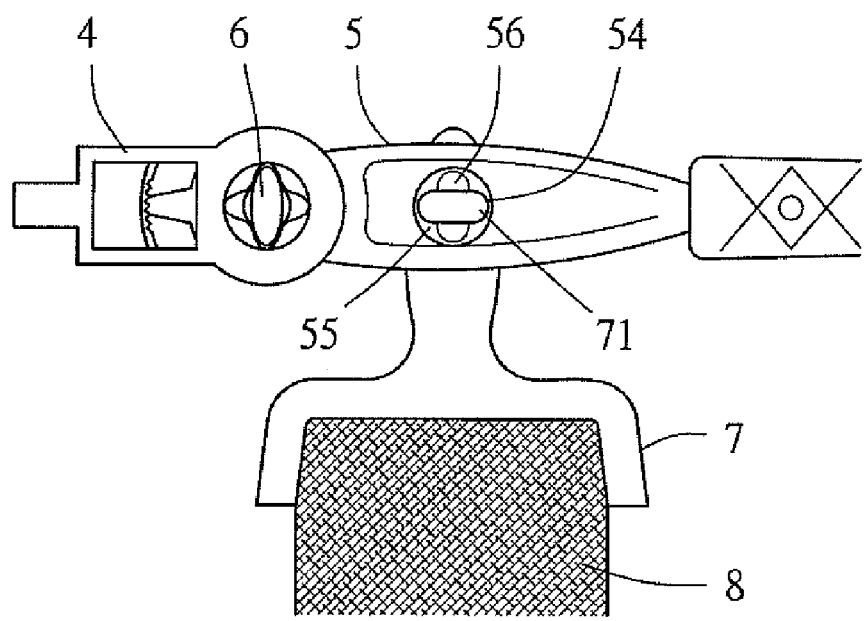
FIG. 12 is a schematic view of a stopping portion at an engaging end of the strap passing through a lateral hole of the eyeglass temple in accordance with the present invention.
Figure 13:
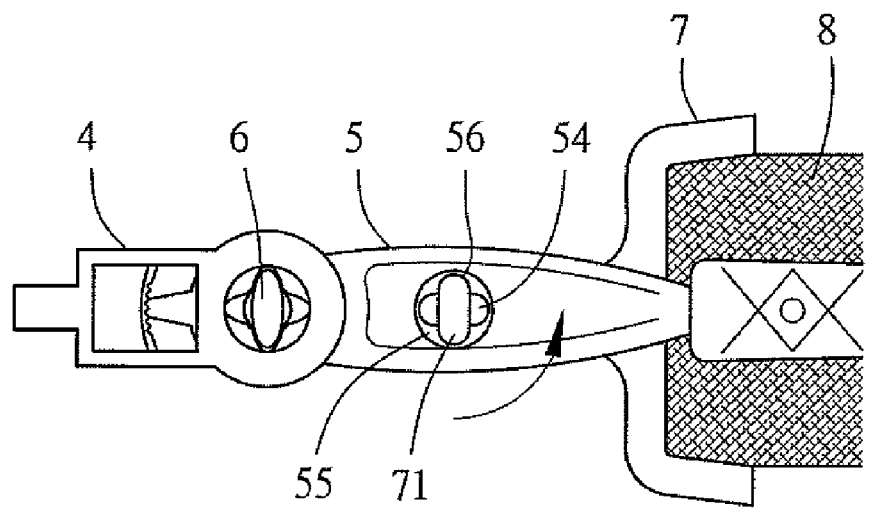
FIG. 13 is a schematic view of the stopping portion rotated at an angle of 90° to engage with an inner groove of the eyeglass temple in accordance with the present invention.
Figure 14:
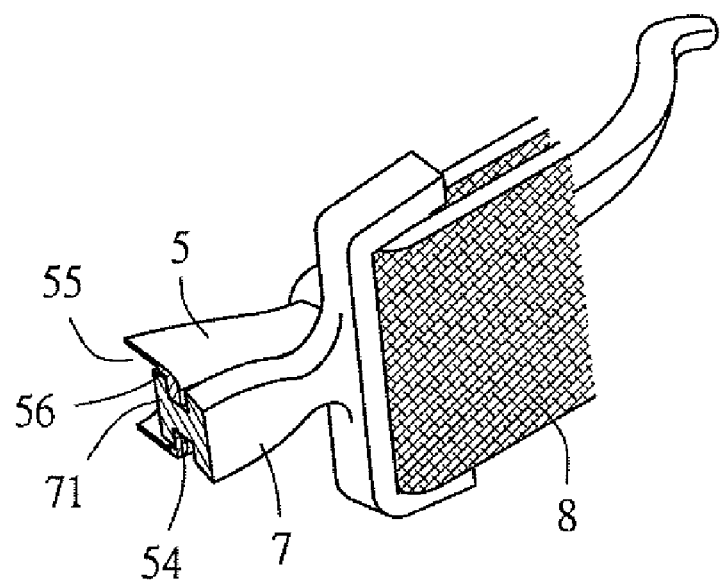
FIG. 14 is a cross-sectional view detailing the stopping portion engaging against a power portion of the inner groove in accordance with the present invention.
Figure 15:
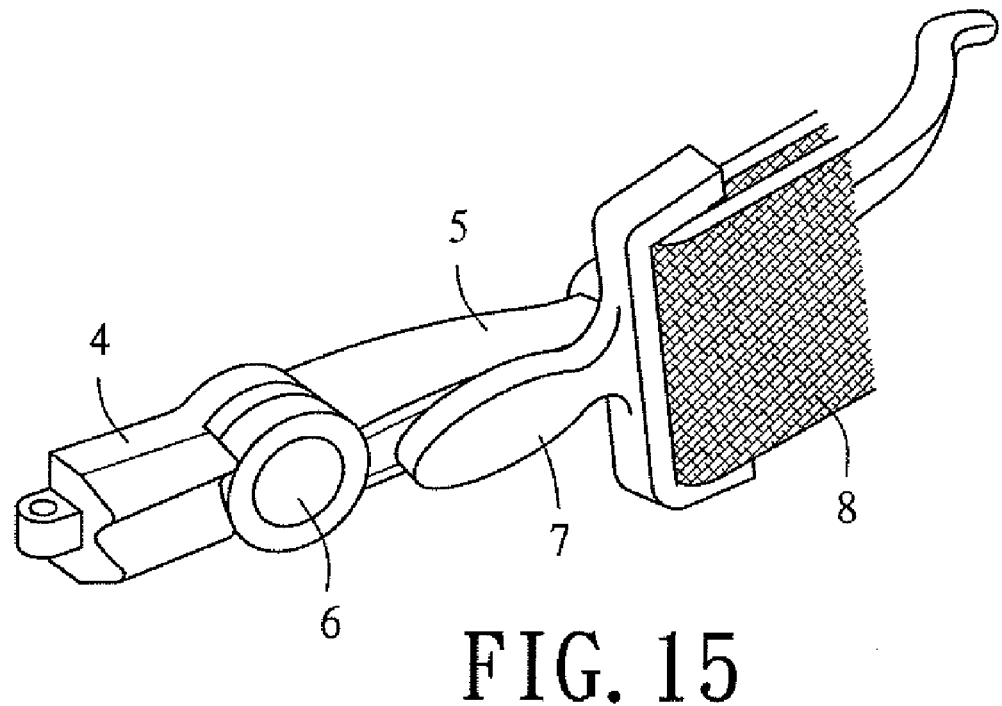
FIG. 15 is a schematic view of the assembly of the strap and the eyeglass temple in accordance with the present invention.

FIGS. 11 and 12 illustrate engagement of one of the eyeglass temples 1 and the strap 8. First, the stopping portion 71 at one of the engaging members 7 on the strap 8 passes through the lateral hole 54 of the eyeglass temple 5. Then, the engaging member 7 is rotated in a direction along with the stopping portion 71. FIG. 13 shows a rotation of 90°. As shown in FIG. 14, the stopping portion 71 can be tightly coupled with a lower portion of the inner groove 56 of the eyeglass temple 5 for positioning purpose. The other engaging member 7 of the strap 8 is engaged with the other eyeglass temple 5 in the similar manner as the above-mentioned such that the strap 8 and both eyeglass temples 5 can be quickly fastened and achieve stable positioning, as shown in FIG. 15, or can be quickly disassembled when it is not needed in the future.

The above-mentioned design of the eyeglass assembly has the following advantages when being assembled and used:

1. The protection strip made of soft material and the secondary eyeglass frame can be easily processed to achieve a stable positioning.

2. The protection strip assembled at one side of the eyeglass frame and the secondary eyeglass frame can be easily disassembled with easy operation when the secondary eyeglasses are not needed.

3. The appearance of the secondary eyeglass frame with the protection strip as well as the main eyeglass frame can be designed with variety so as to enhance the esthetics of the eyeglass assembly.

4. The shift element at one end of each eyeglass temple can make a stable positional shift following the boundary element on the connecting element when the eyeglass temples pivotally connected to the eyeglass frame are moved as needed.

5. The stopping portions at the engaging members bundled at both ends of the strap can pass through the lateral holes provided on the eyeglass temples and then rotate at a direction such that the stopping portions are tightly coupled to the inner grooves in a lower position of the eyeglass temples in order to achieve stable positioning.

6. When the strap between the eyeglass temples pivotally connected to the eyeglasses for sport purpose is not in use, the stopping portions at the strap can be easily and fast disassembled and taken out.

7. The engaging assembly of the strap can be manufactured easily so that in addition to the easy engagement between the eyeglasses and the strap for sport purpose, the cost of process is greatly reduced.

What is claimed is:

1. An eyeglass assembly, having a strap connected with eyeglass temples of eyeglasses for sport purpose;

wherein a lateral hole is provided on an outer side at a predetermined section on each of the eyeglass temples pivotally connected to both sides of an eyeglass frame so as to communicate a recess at an inner side thereof, and an crossed inner groove is formed between the lateral hole and the recess so as to allow a stopping portion of an engaging member at each end of the strap to rotate at a direction after being inserted into the lateral hole of the eyeglass temple so that the stopping element is tightly coupled with a lower portion of the inner groove, whereby the strap and the eyeglass temples are quickly fastened and firmly positioned and can be easily disassembled.

* * * * *